(12) United States Patent
Botbol et al.

(10) Patent No.: US 11,947,899 B2
(45) Date of Patent: Apr. 2, 2024

(54) DETERMINING TEXT VISIBILITY DURING USER SESSIONS

(71) Applicant: Content Square SAS, Paris (FR)

(72) Inventors: Steven Botbol, Paris (FR); Tristan Giovangrandi, Paris (FR); Arnaud Bodenan, Houilles (FR); Henrique Cesar, Ermont (FR); Francois Le, Paris (FR); Ryad Zenine, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/204,125

(22) Filed: May 31, 2023

(65) Prior Publication Data

US 2023/0385528 A1 Nov. 30, 2023

Related U.S. Application Data

(60) Provisional application No. 63/347,414, filed on May 31, 2022.

(51) Int. Cl.
| | | |
|---|---|---|
| *G06F 40/14* | (2020.01) | |
| *G06F 16/951* | (2019.01) | |
| *G06F 16/953* | (2019.01) | |
| *G06F 16/957* | (2019.01) | |

(52) U.S. Cl.
CPC ............ *G06F 40/14* (2020.01); *G06F 16/951* (2019.01); *G06F 16/953* (2019.01); *G06F 16/9577* (2019.01)

(58) Field of Classification Search
CPC .... G06F 40/14; G06F 16/953; G06F 16/9577; G06F 16/951
See application file for complete search history.

(56) References Cited

U.S. PATENT DOCUMENTS

| | | | | |
|---|---|---|---|---|
| 2012/0284290 A1* | 11/2012 | Keebler | ................ | G06F 16/958 707/756 |
| 2015/0012363 A1* | 1/2015 | Grant | ................. | G06Q 30/0269 705/14.66 |
| 2022/0207232 A1* | 6/2022 | Pinnamaneni | ...... | G06F 16/9577 |

* cited by examiner

*Primary Examiner* — Scott T Baderman
*Assistant Examiner* — Seung Woon Jung
(74) *Attorney, Agent, or Firm* — Schwegman Lundberg & Woessner, P.A.

(57) ABSTRACT

The subject technology receives, from a document object model, a set of nodes of a web page, each node corresponding to an element of the web page. The subject technology determines, using an intersection observer, a position and visibility of a set of first elements within a viewport of the web page. The subject technology determines, using a mutation observer, a set of new elements within the viewport that was previously hidden and now visible. The subject technology provides a set of visible elements, based at least in part on the set of new elements and the set of first element, as elements that have been seen by a user during a session. The subject technology generates an index based at least in part on the set of visible elements, the index comprising information corresponding to text that was visible to the user during the session.

30 Claims, 14 Drawing Sheets

802

- seenInViewPort:
  - element with another transparent element above (like a transparent overlay) is not considered as seenInViewPort
- seenGlobally:
  - element with an opaque element above is considered as seenGlobally
  - element outside document bound is considered as seenGlobaly
- seenInViewPort + seenGlobally:
  - if an element that has already been seenInViewPort or seenGlobally mutates in a way that completely changes the text the new text is not considered

| description | why | improvement |
|---|---|---|
| When outside of viewPort: element with other element above are sent as seenGlobally but is considered not visible | because can't use elementFromPoint outside of viewPort | / |
| When inside of viewPort : element with other elements transparent above are not sent as seenInViewPort but they are visible | because use elementFromPoint to check if the element is the topElement | use elementsFromPoint that return an array of elements above and check if these elements are transparent |

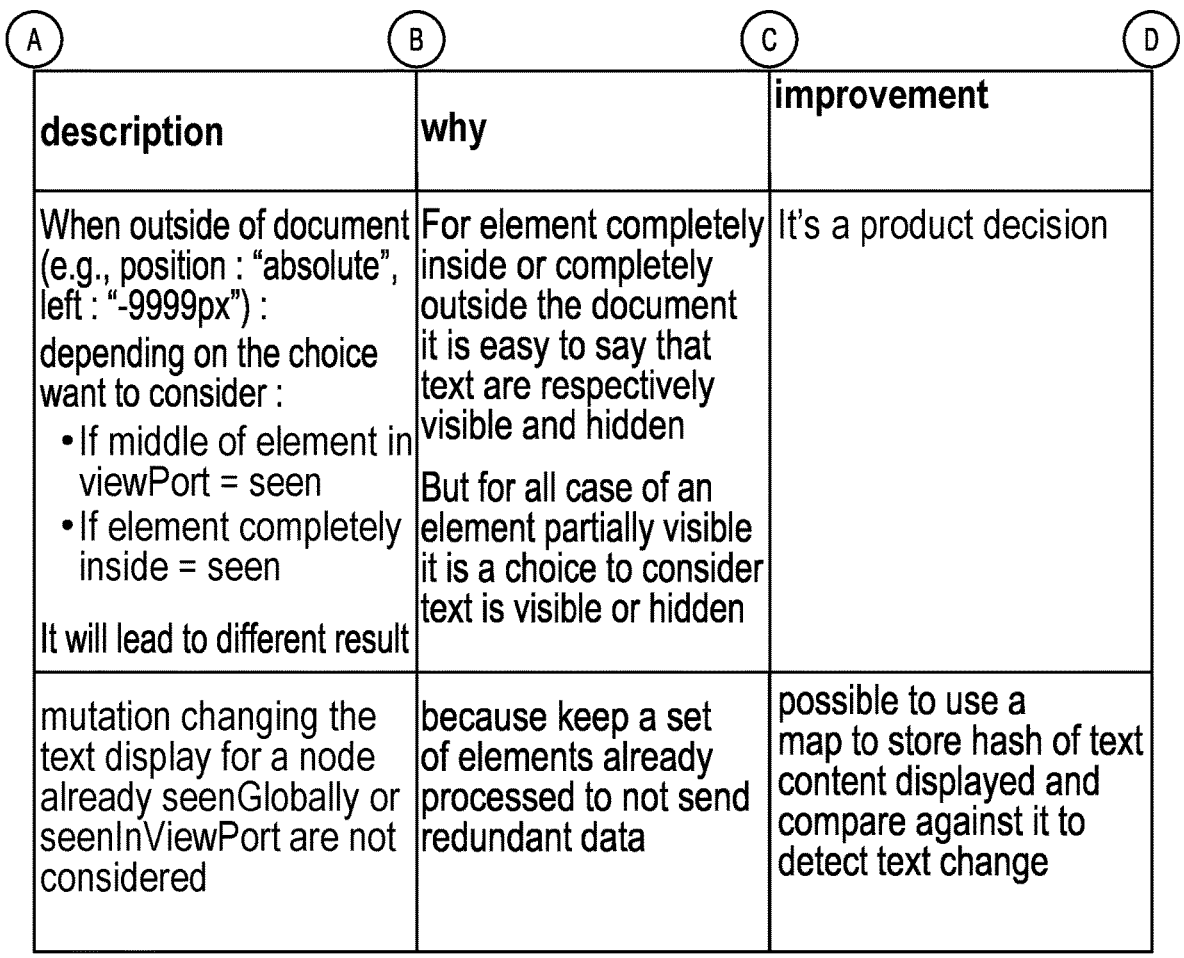

| A | B | C | D |
|---|---|---|---|
| description | why | improvement | |
| When outside of document (e.g., position : "absolute", left : "-9999px") : depending on the choice want to consider : <br>• If middle of element in viewPort = seen <br>• If element completely inside = seen <br><br>It will lead to different result | For element completely inside or completely outside the document it is easy to say that text are respectively visible and hidden <br><br>But for all case of an element partially visible it is a choice to consider text is visible or hidden | It's a product decision | |
| mutation changing the text display for a node already seenGlobally or seenInViewPort are not considered | because keep a set of elements already processed to not send redundant data | possible to use a map to store hash of text content displayed and compare against it to detect text change | |

FIG. 8B

DETERMINING TEXT VISIBILITY DURING USER SESSIONS

PRIORITY CLAIM

This application claims the benefit of priority of U.S. Provisional Patent Application No. 63/347,414, filed May 31, 2022, which is hereby incorporated by reference herein in its entirety for all purposes.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

To increase user visitations and revenue, web sites have become very sophisticated. Web sites typically include web pages that provide information to users, advertise products or services to users and/or provide site search functions for users. A problem for web site owners is how to determine how successful the web site is, for example, whether the informational or other needs of users are met and whether the users are purchasing goods and services advertised on their site.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 8A illustrates example system characteristics in accordance with one embodiment.

FIG. 8B illustrates a continuation of example system characteristics in accordance with one embodiment.

DETAILED DESCRIPTION

Embodiments of the subject technology perform operations to index and search text that was present on a web page when a user was browsing a website. The subject system is able to determine whether a piece of text, which is included in the HTML code of the web page, was visible in the viewport of the user when the user was browsing the website (e.g., as part of a user session corresponding to a session replay). In particular, using such information, the subject system indexes and searches only on the text that is visible to the user thereby avoiding indexing and searching an entirety of textual information included in a given web page(s) during the user session.

Networked Computing Environment

Figure 1:
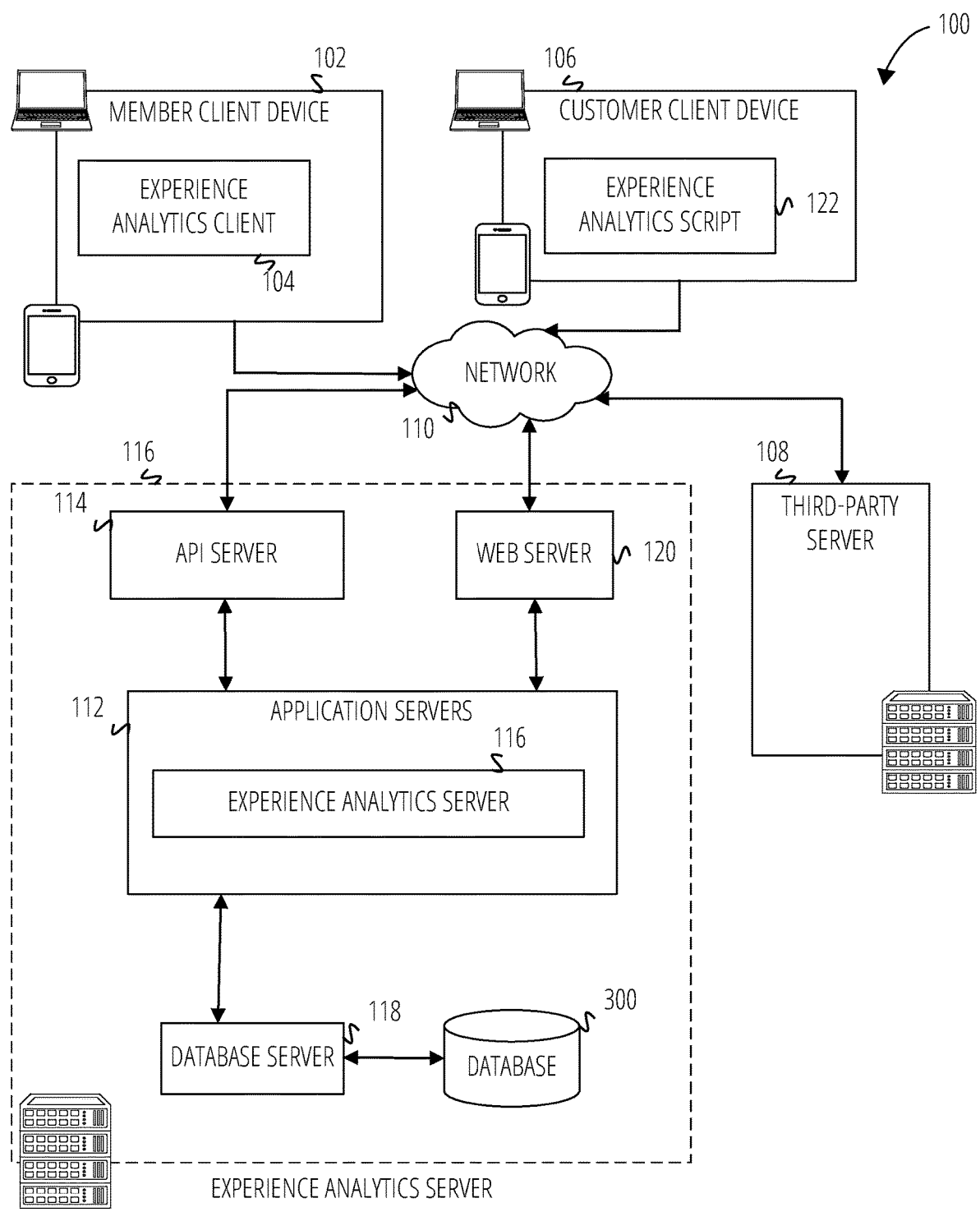
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100 that has a website hosted on by the client's third-party server 108. For example, the client can be a retail store that has an online retail web site that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server 116 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can users navigating a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server 116. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server 116 via the network 110. In another example, the experience analytics script 122 transmits the data to the third-party server 108 and the data can be transmitted from the third-party server 108 to the experience analytics server 116.

An experience analytics client 104 is able to communicate and exchange data with the experience analytics server 116 via the network 110. The data exchanged between the experience analytics client 104 and the experience analytics server 116, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server 116 supports various services and operations that are provided to the experience analytics client 104. Such operations include transmitting data to and receiving data from the experience analytics client 104. Data exchanges to and from the experience analytics server 116 are invoked and controlled through functions available via user interfaces (UIs) of the experience analytics client 104.

The experience analytics server 116 provides server-side functionality via the network 110 to a particular experience analytics client 104. While certain functions of the experience analytics system 100 are described herein as being performed by either an experience analytics client 104 or by the experience analytics server 116, the location of certain functionality either within the experience analytics client 104 or the experience analytics server 116 may be a design choice. For example, it may be technically preferable to initially deploy certain technology and functionality within the experience analytics server 116 but to later migrate this technology and functionality to the experience analytics client 104 where a member client device 102 has sufficient processing capacity.

Turning now specifically to the experience analytics server 116, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
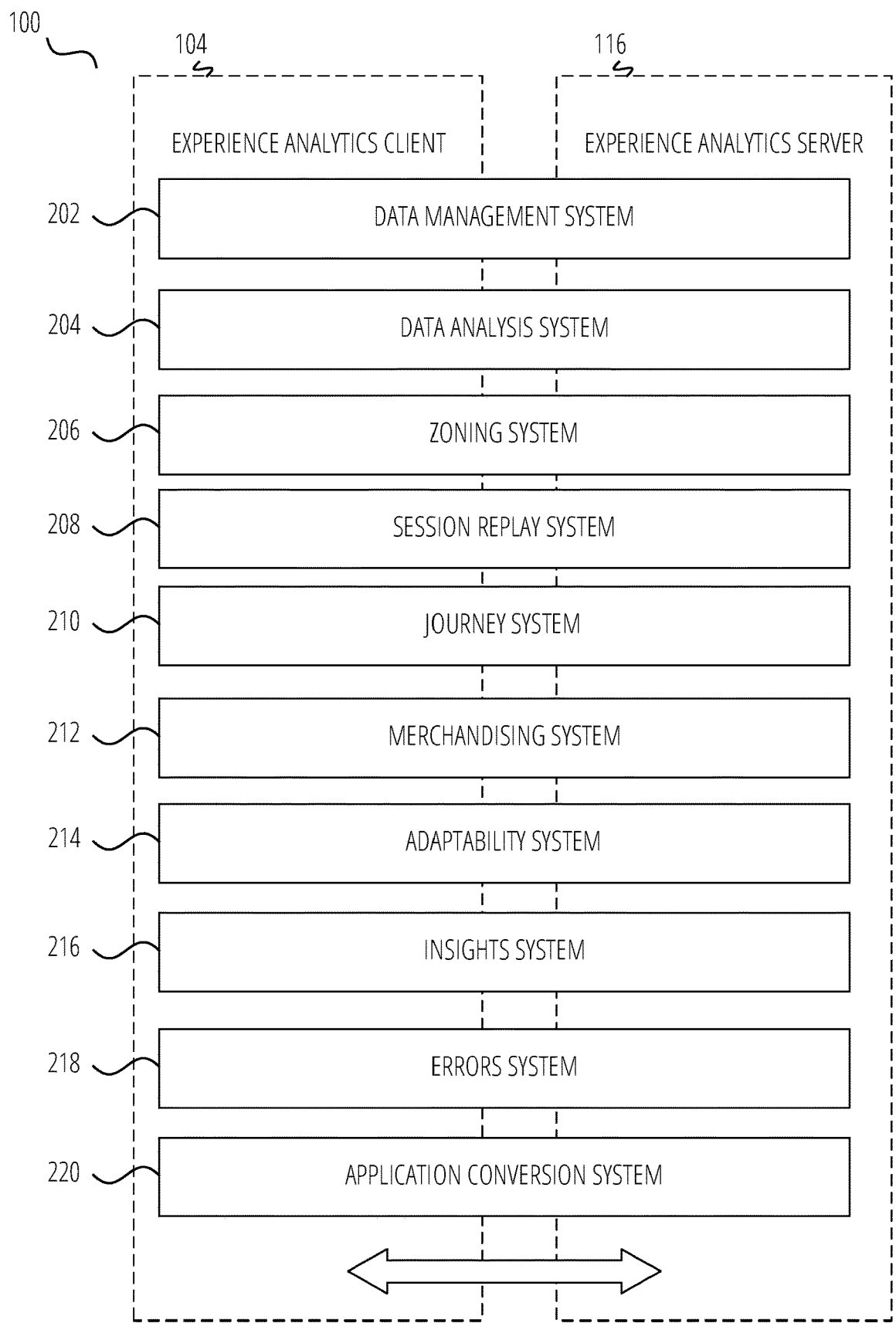
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

In an embodiment, data analysis system 204 generates a set of metrics referred to herein as insight metrics based on analyzing the data received by the data management system 202. In an example, such insight metrics may indicate insights such as, but not limited to, hesitation or decisiveness, friction (i.e., whether the portion is contributing to premature terminations of interactions), unusual behavior (e.g., abnormal speed of interactions as compared to previous interactions by users), and the like, with respect to a field or e-form. In an embodiment, the data analysis system 204 identifies one or more friction-causing fields (i.e., fields associated with users becoming frustrated and increasing likelihood of premature termination) based on the insight metrics.

In an example where a given web page on a retail website includes an e-form that contains different fields for user input or text entry, metrics based on the insight metrics serve as the basis for demonstrating insights related to user interactions with each field as determined based on the data received by the data management system 202. Example insight metrics may include, but are not limited to, friction scores (i.e., scores indicating a degree of difficulty experienced by users), impact on motivation to share (IMS) scores, behavioral quality scores, cues of deception scores, technological savviness scores, hesitation scores, decisiveness scores, trust scores, trustworthiness scores, frustration scores, carefulness scores, search scores, login scores, emotion scores, sentiment scores, and confusion scores. As a non-limiting example, long average pause times coupled with terminations shortly thereafter may result in a high friction score for a field, suggesting that users encountering that field become frustrated and quit. As another non-limiting example, short average pause and total typing times may result in high trustworthiness scores, suggesting that users interacting with the field were providing honest and accurate information.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on a conversions (e.g., sales, revenue) associated with a placement or zone in the client website.

The adaptability system 214 is responsible for creating accessible digital experiences for the client's web site to be displayed by the customer client devices 106 for users' that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can analyze the data from the experience analytics script 122 to determine whether an accessibility-enhanced version of the client's website is needed and generates the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on within a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that causes frustration to the users (e.g., users on customer client devices 106 visiting the client's website). The errors can also include causes of looping behaviors by the users, in-page issues such as unresponsive call to actions and slow loading pages, etc. The errors can be displayed by the member client devices 102 via the experience analytics client 104 on within a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, merchandising interface, insights interface, and errors interface to be displayed by the member client device 102 via the experience analytics client 104. The application conversion system 220 generates an accessibility-enhanced version of the client's mobile application to be displayed by the customer client devices 106.

As mentioned above, session replay system 208 provides session replay(s) of sessions from the customer client device 106. In an embodiment, the session replay system 208 enables a session player that provide playback of an entire user session for a particular user. The session player can be accessed by the member client device 102 for playback of sessions when the session player is executed by the session replay system 208. Alternatively or conjunctively, member client device 102 can execute a session player locally which communicates with the session replay system 208 (and, if needed, other components of experience analytics system 100) to enable playback of sessions. In an embodiment, experience analytics client 104, executing on member client device 102, can provide the functionality of the aforementioned session player for playback of session(s).

A session replay is basically a visualization of a flow of events representing states of screens at a given moment. The events are regrouped by sessions and sorted by dates (e.g., timestamps). A batch of events are received and session replay system 208 can replay the events using a player that performs a conversion of a description of the screen to an HTML document that changes for each event received. In an implementation, a DOM can be generated to represent a screen (e.g., corresponding to a particular web page) during the replay, where changes to the DOM (e.g., insertions, deletions, updates, and the like) can indicate changes to elements of a given web page represented by the DOM.

Data Architecture

Figure 3:
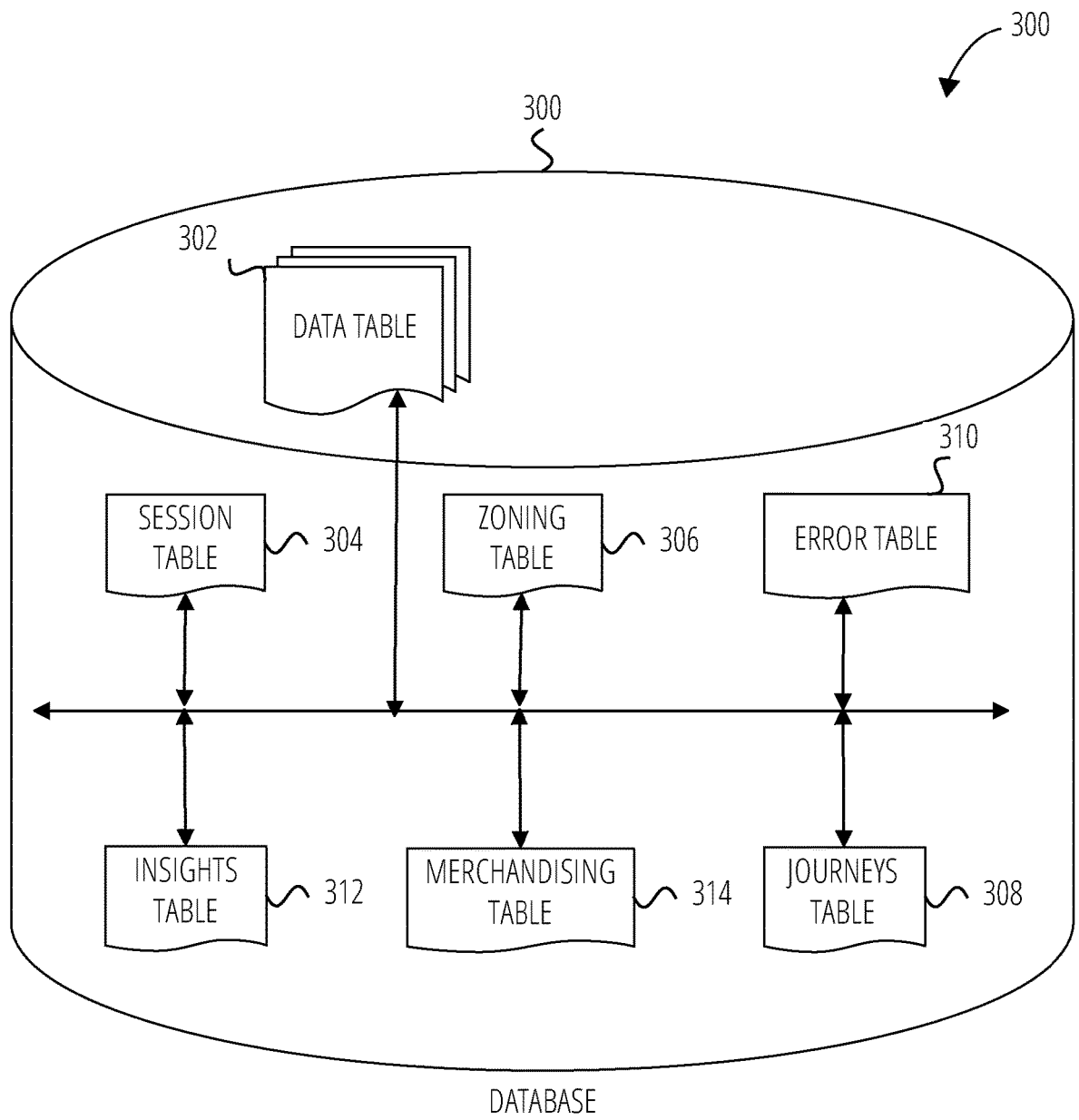
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the web site being displayed on the customer client device 106, the elements on the web site being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the web site or application, etc.

Figure 4:
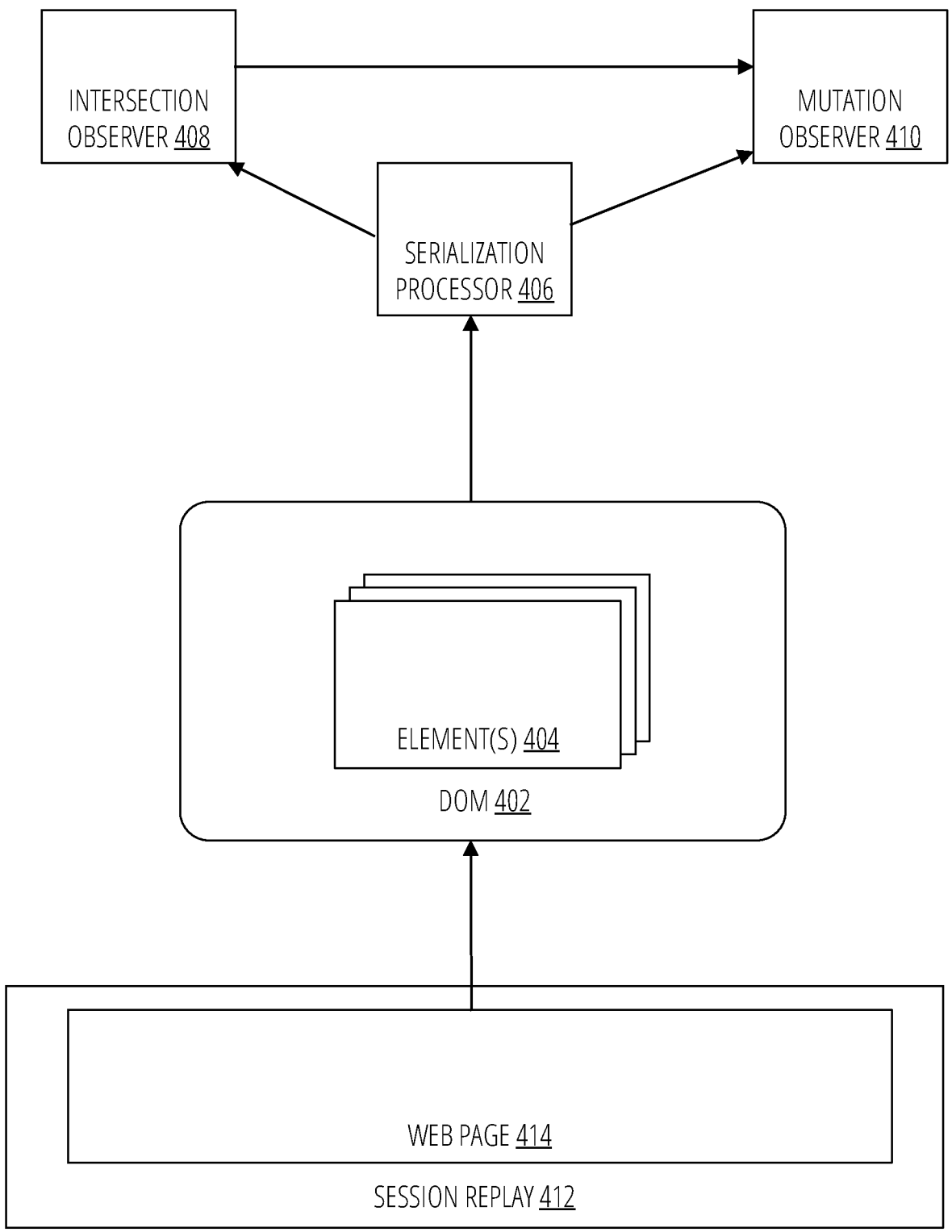
FIG. 4 illustrates an example processing flow for example components determining text visibility, in accordance with some embodiments of the present disclosure.

FIG. 4 illustrates an example processing flow for example components determining text visibility, in accordance with some embodiments of the present disclosure.

In an implementation, as referred to herein, a DOM (Document Object Model) is a "node and link" representation of the contents of a web page, representing the elements of the web page as "nodes" and the relationships between the elements as "links." The DOM provides for a representation of the web page in a format other than that displayed in a user's web browser, indicating the contents and structure of the web page without requiring review of the page's underlying HTML code.

As shown in the example of FIG. 4, a serialization processor 406 receive all nodes (e.g., corresponding to element(s) 404 of DOM 402) serialized during session replay 412, and then an intersection observer 408 is notified of element(s) 404 in a viewport and a mutation observer 410 that checks if a hidden element (that was hidden before) has now become visible.

In an implementation, intersection observer 408 observes a DOM element's (e.g., one of element(s) 404) visibility and positions, and enables controlling the element's loading and other behaviors (e.g., animations and the like) based on the target element's visibility and positions. The interface observer 408 can be provided as an interface to asynchronously observe changes in an intersection of a target element with an ancestor element or with a top-level document's viewport, where the ancestor element or viewport is referred to as the root in an example. In an example, the interface observer 408 is configured to provide a notification (or perform some other action such as a callback to invoke or execute a particular function) when a target element intersects either the device's viewport or a specified element. The specified element is referred to as the root element (or simply "root").

In an implementation, mutation observer 410 observes a DOM tree (e.g., DOM 402 where elements(s) 404 are node of such a tree) of a given web page (e.g., web page 414), and detects changes (e.g., insertions, deletions, updates, and the like) being made to the DOM (e.g., DOM 402). The mutation observer 410 can be provided as an interface that notifies that a particular element's attributes, text or contents changed, and monitors whether child nodes of the DOM have been added or removed.

In an implementation, to confirm an element has been seen, a second check is performed for visible element(s) after a particular period of time (e.g., 1 second, a few seconds, and the like). In an embodiment, the serialization processor 406, intersection observer 408, and mutation observer 410 are provided by experience analytics client 104 or experience analytics server 116, or by components thereof (e.g., API server 114 providing an API(s) for accessing any or all of the aforementioned components for determining text visibility).

The following is a table showing operations that are performed in accordance with embodiments of the subject technology to determine text visibility for elements in a given web page. Such elements can correspond to different nodes in a DOM corresponding to the web page.

| Check element visibility | if in viewPort | if outside viewPort |
|---|---|---|
| element CSS make it hidden (transparent, hidden prop, . . .) | by checking element CSS properties | by checking element CSS properties |
| another element is above | using elementFromPoint (e.g., returns the topmost element at the specified coordinates (relative to the viewport)) to get the top element at this position. with the possible false positive if all elements above the checked element are transparent, and choosing between false positive or false negative seen texts | N/A |
| element is outside document | By checking element bounding is inside document But depending on what is chosen as a limit (e.g., middle of element in document, element completely in document), choosing between false positive or false negative seen texts | |

Figure 5:
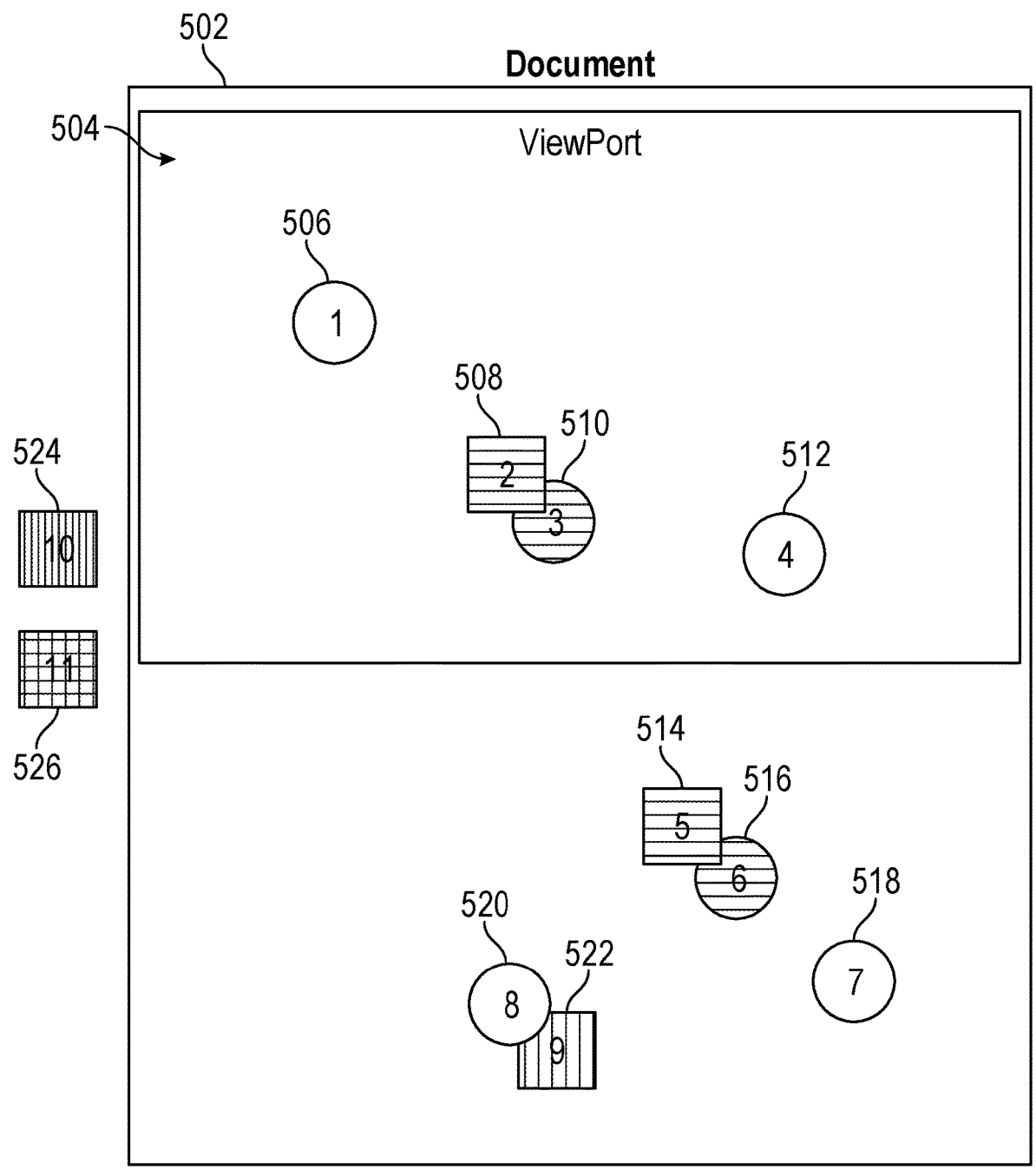
FIG. 5 illustrates an example of text visibility in accordance with one embodiment.

FIG. 5 illustrates an example of text visibility in accordance with one embodiment.

As shown, document 502, includes a viewport 504. In viewport 504, element 506, element 508, element 510, and element 512 are included. Outside of viewport 504, document 502 includes element 514, element 516, element 518, element 520, and element 522. Outside of document 502, element 524 and element 526 are shown.

In this example, element 506, and element 512 are visible elements and are on top of other elements in viewport 504. Other visible elements in document 502 (but not in viewport 504) include element 518, and element 520 which are visible and are on top of other elements. Elements that correspond to (e.g., include) CSS (Cascading Style Sheets) properties include element 508, element 514, element 522, element 524, and element 526. Examples of such CSS properties include an opacity CSS property that sets the opacity of an element. Opacity is the degree to which content behind an element is hidden, and the lower the value, the more transparent an element will appear.

Element 524 is not visible because this element is outside of document 502, but is considered visible based on its CSS properties. Element 526 is not visible because this element is outside of document 502 and is considered hidden based on its CSS properties.

Element 508 in viewport 504 is not visible (e.g., hidden because of CSS properties, such as transparency, the like) and is on top of all other elements (e.g., element 510). Element 510 is visible with other elements (e.g., element 508) that are transparent above or overlayed (e.g., this element is still visible because other element(s) above are transparent). In an example, however, element 510 is considered hidden even though it is visible (e.g., based on its CSS properties) since a transparent element (e.g., element 508) is above it.

Outside of viewport 504 in document 502, element 514 is not visible and on top of all other elements. Although element 516 is visible according to its CSS properties with other elements transparent above or overlayed (e.g., this element is still visible because other element(s) above are transparent) but is considered hidden. Element 518 and element 520 are visible and on top of other elements. In an example, although element 522 is visible according to its CSS properties but is also considered hidden (e.g., not visible) because another element (e.g., element 520) is above it.

Outside of document 502, element 524 is not visible because of being outside of document 502 (but visible according to its CSS properties). Element 526 is not visible because of being outside of document 502 and hidden by its CSS properties.

In the example of FIG. 5, element 506 and element 512 are considered visible within viewport 504. A set of elements that are seen globally (e.g., seen in document 502 but not necessarily in viewport 504) are element 506, element 512, element 516, element 518, and element 520 in an example.

Figure 6:
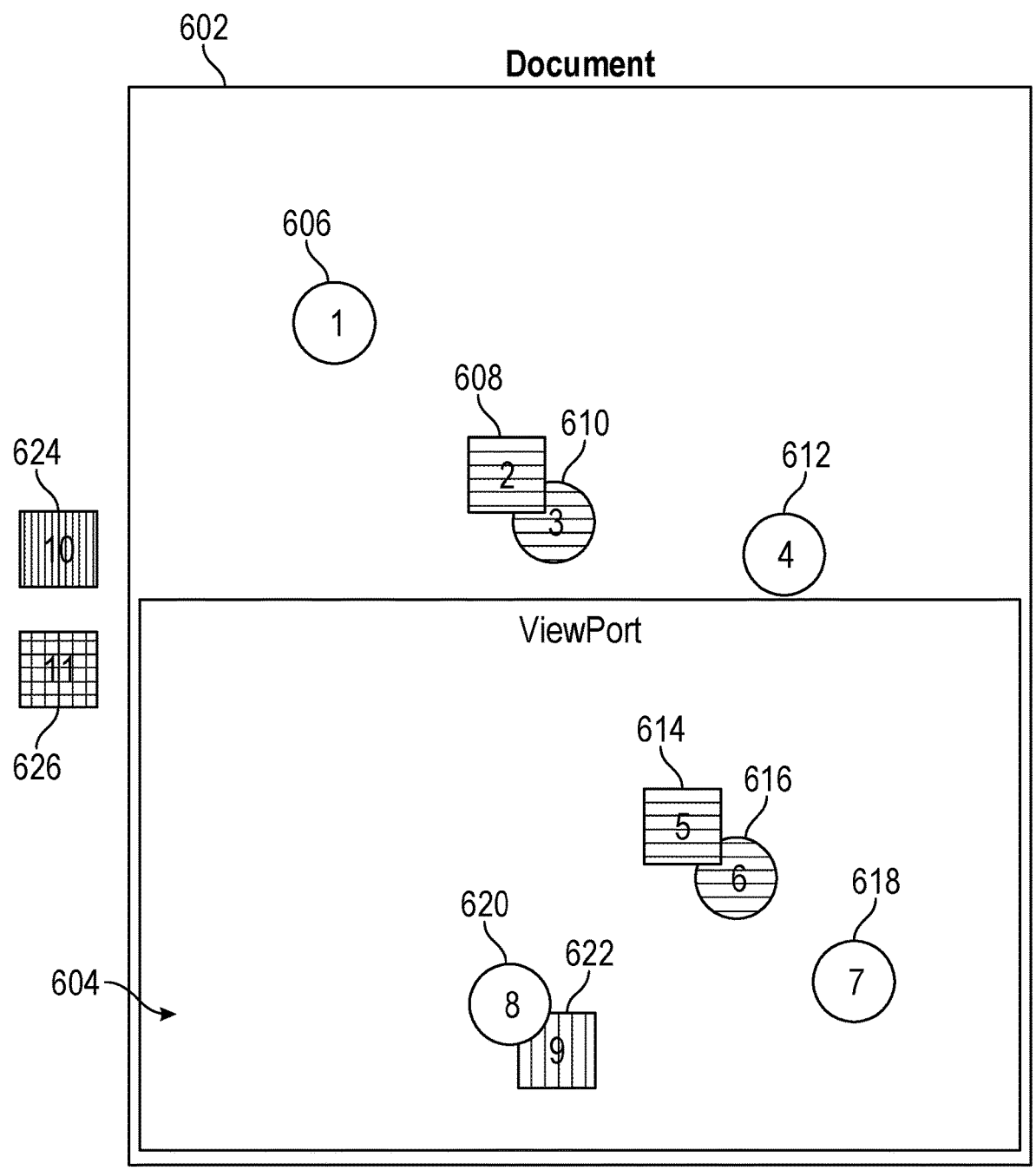
FIG. 6 illustrates an example of text visibility in accordance with one embodiment.

FIG. 6 illustrates an example of text visibility in accordance with one embodiment.

As shown, document 602 includes a viewport 604. Inside of viewport 604, document 602 includes element 614, element 616, element 618, element 620, and element 622. Outside of viewport 604, element 606, element 608, element 610, and element 612 are included. Outside of document 602, element 624 and element 626 are shown.

Visible elements in document 602 and in viewport 604 include element 616, element 618, and element 620. In this example, element 606, element 610, element 612 are visible elements outside of viewport 604. Elements that correspond to CSS properties include element 608, element 614, element 622, element 624, and element 626.

Inside of viewport 604 in document 602, element 618 and element 620 are visible and on top of other elements. Although element 622 is considered visible according to its CSS properties, element 622 is not visible because another element (e.g., element 620) is above it. Element 614 is not visible and on top of all other elements. Although element 616 is visible according to its CSS properties with other elements transparent above or overlayed (e.g., this element is still visible because other element(s) above are transparent), element 616 is considered not visible since it has element 614 on top of it.

Element 608 outside of viewport 604 is not visible (e.g., hidden because of its CSS properties, the like) and on top of all other elements. Although element 610 according to its CSS properties is visible with other elements that are transparent above or overlayed (e.g., this element is still visible because other element(s) above are transparent), element is considered hidden because another element (e.g., element 608) is above it. In an example, checking an element is visible occurs only when an element is within the viewport (e.g., checking whether any element outside of viewport 604 is visible is not performed).

Outside of document 602, element 624 is not visible because of being outside of document 602 (but visible according to its CSS properties). Element 626 is not visible because of being outside of document 602 and hidden by its CSS properties.

In the example of FIG. 6, element 618 and element 620 are considered visible within viewport 604. A set of elements that are seen globally (e.g., seen in document 602 but not necessarily in viewport 604) are element 618, element 620, element 606, element 612, and element 610.

Figure 7:
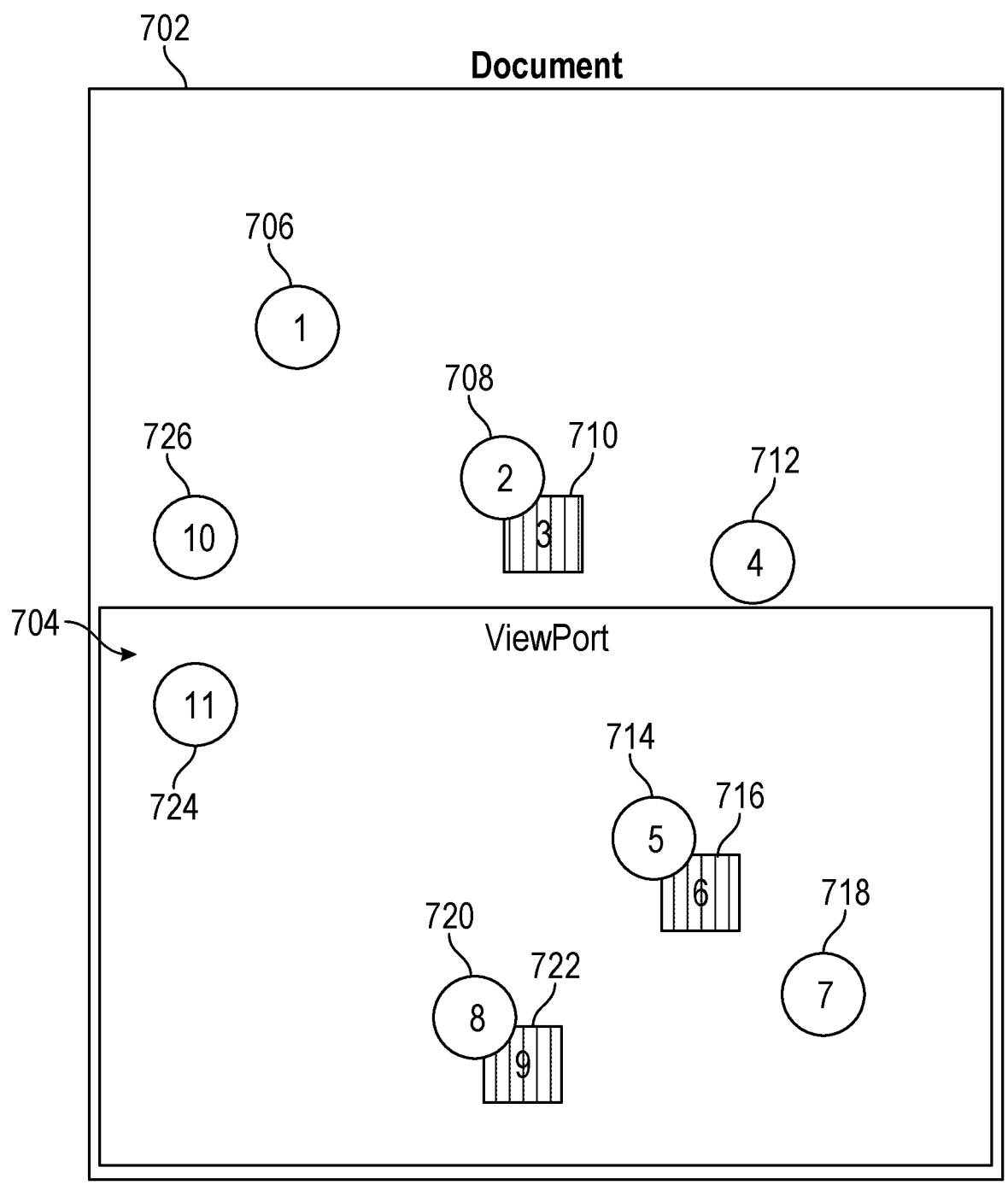
FIG. 7 illustrates an example of text visibility in accordance with one embodiment.

FIG. 7 illustrates an example of text visibility in accordance with one embodiment.

As shown, document 702 includes a viewport 704. In viewport 704, document 702 includes element 714, element 716, element 718, element 720, element 722, and element 724. Outside of viewport 704, element 706, element 708, element 710, element 712, and element 726 are included.

FIG. 7 illustrates changes that have occurred to a DOM that represented the document 602 discussed above in FIG. 6. In particular, in the example of FIG. 7, there are mutations (e.g., modifications or changes) in the DOM that lead to:
- element 726 and element 724 moving inside the DOM
- element 708 and element 714 becoming visible Each of the elements are observed (for style and class change) so that a change on any elements will trigger a determination for text visibility.

In the example of FIG. 7, element 714, element 718, element 720, and element 724 are considered visible (e.g., text that is visible on screen) and on top of other elements within viewport 704. A set of elements that are seen globally (e.g., text visible in web page but not necessarily visible within viewport 704)) are element 714, element 718, element 720, element 724, element 706, element 708, element 710, element 712, and element 726.

In viewport 704, although element 716 and element 722 are visible based on their CSS properties, element 716 and element 722 are considered not visible because another element (e.g., element 714 or element 720) is above each one. On a global level, all elements in document 702 are considered visible, however any elements outside of viewport 704 are not checked for text visibility.

In another example, when there is a subsequent mutation or change to element 726 and element 724, these changes can completely change the text displayed by these elements. However, in an embodiment, these changes are not tracked again.

The following are example code statements in which an IntersectionOserver watches for when a target element becomes visible in the viewport. When the target element is visible in the viewport, a MutationObserver is generated to observe changes to the target element's children. If a child element is added or removed, a message will be logged to the console. Once the target element becomes visible, the IntersectionOserver is disconnected.

```
// Define the callback for the IntersectionObserver
function intersectionCallback(entries, observer) {
    entries.forEach(entry => {
        if (entry.isIntersecting) {
            console.log('Element is now visible in the viewport');
            // Create a MutationObserver instance to observe changes to
the target element's children
            const mutationObserver = new MutationObserver((mutations) => {
                mutations.forEach((mutation) => {
                    console.log('A child element was added or removed');
                });
            });
            // Start observing the target element for changes in its child
list
            mutationObserver.observe(entry.target, { childList: true });
            // Disconnect the IntersectionObserver once the target element
becomes visible
            observer.disconnect( );
        }
    });
}
// Create an IntersectionObserver instance with the callback
const intersectionObserver = new
IntersectionObserver(intersectionCallback);
// Target element to be observed
const targetElement = document.querySelector ('#target-element');
// Start observing the target element for intersection changes
intersectionObserver.observe(targetElement);
```

Although the above example relates to providing output to a console (e.g., client display) to indicate whether the target element is visible, or when changes are made to the target element's child nodes, it is appreciated that any other appropriate action can be performed instead. For example, an operation can be performed to mark the target element as being seen during a user session in which each marked element is provided for including in an index that can be utilized for searching visible text that was seen during a session replay.

FIG. 8A illustrates examples of system characteristics 802 in accordance with one embodiment.

As shown, system characteristics 802 includes various limitations that the subject system handles in order to determine text visibility as described before.

In an example of whether an element is seen in a viewport ("seenInViewPort"), an element with another transparent element above (e.g., a transparent overlay) is not considered as being seen in the viewport.

In an example of whether an element is seen globally ("seenGlobally"), an element, with an opaque element above it, is considered to be seen globally. Further, an element that is outside of a document bound is considered to be seen globally.

In an example of whether an element is seen in the viewport and seen globally, if an element, which has already been seen in the viewport or seen globally, mutates in a way that changes the test, then the new text is not considered (e.g., similar to the example described in FIG. 7).

In the table shown in FIG. 8A, different characteristics are further described.

When an element is outside of the viewport, an element, with another element above it, is considered as seen globally but is considered not visible because a function (e.g., "elementFromPoint") to determine a set of elements above a particular element at specified coordinates (relative to the viewport) is not available for an element outside of the viewport.

When an element is inside the viewport, but includes other transparent elements above it, then this element is visible in the viewport but considered hidden (e.g., not visible). Within the viewport, a function (e.g., "elementFromPoint") to determine a set of elements above a particular element at specified coordinates (relative to the viewport) can be applied to the element to determine whether other (transparent) elements are on top of the element.

FIG. 8B illustrates a continuation of example system characteristics 802 in accordance with one embodiment.

As shown, system characteristics 802 includes additional examples from the discussion in FIG. 8A above.

When an element is completely outside of a document based on its determined location or coordinates (e.g., position: "absolute", left:"−9999px"), then a determination of whether the element is seen or hidden is straightforward. However, for an element where such an element is partially inside the viewport, different approaches can be taken. For example, if the middle of such an element is within the viewport, the element can be considered visible. Alternatively, such an element could be instead been considered hidden when the middle of the element is within the viewport.

When a mutation changes an element (e.g, the text corresponding to the element) where such an element was previously seen globally or seen in the viewport, then such a mutation is not considered (e.g., not processed) to avoid sending redundant data in an example.

Figure 9:
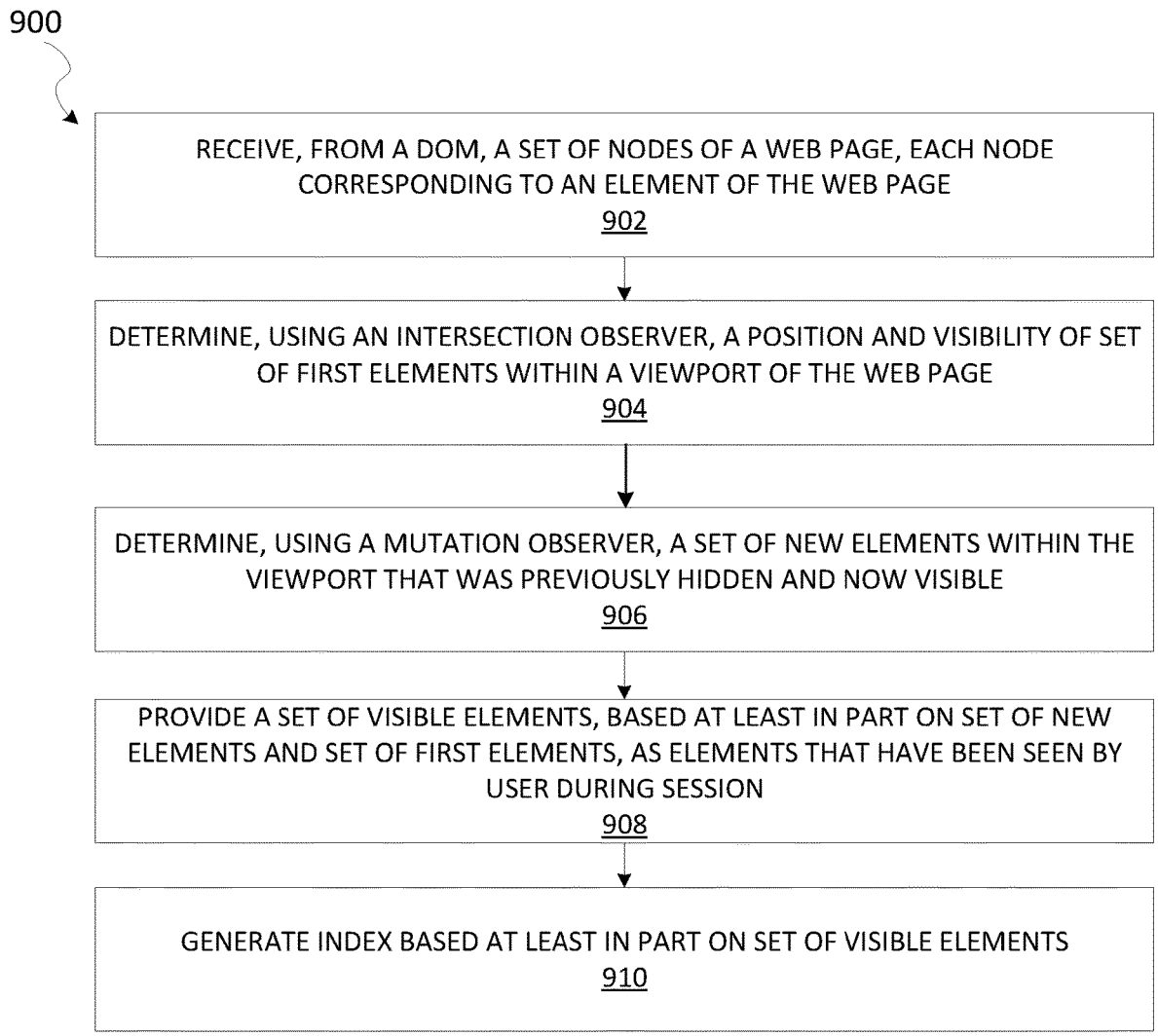
FIG. 9 is a flowchart for a process, in accordance with some examples.

FIG. 9 is a schematic diagram illustrating a process 900, in accordance with embodiments of the subject technology.

In block 902, experience analytics server 116 receives, from a document object model, a set of nodes of a web page, each node corresponding to an element of the web page.

In an embodiment, a serialization processor receives the document object model corresponding to the web page, and the document object model is extracted from information included in a session replay of the session.

In block 904, experience analytics server 116 determines, using an intersection observer, a position and visibility of a set of first elements within a viewport of the web page.

In an embodiment, determining, using the intersection observer, the position and visibility of the set of first elements within the viewport comprises: experience analytics server 116 determines that a particular position of a particular element is included in the viewport, and experience analytics server 116 determines that the particular element is visible within the viewport based on the particular position of the particular element corresponding to a set of coordinates within the viewport.

In an embodiment, the set of coordinates comprises a horizontal coordinate relative to a left edge or a right edge of the viewport, and a vertical coordinate relative to a top edge or a bottom edge of the viewport.

In an embodiment, the set of first elements corresponds to a portion of the set of nodes of the web page from the document object model.

In block 906, experience analytics server 116 determines, using a mutation observer, a set of new elements within the viewport that was previously hidden and now visible.

In an embodiment, determining, using the mutation observer, the set of new elements within the viewport that was previously hidden and now visible comprises: experience analytics server 116 determines that a set of attributes of a particular element has changed, and determines that a child node has been added to or removed from a particular node corresponding to the particular element.

In block 908, experience analytics server 116 provides a set of visible elements, based at least in part on the set of new elements and the set of first element, as elements that have been seen by a user during a session.

In block 910, experience analytics server 116 generates an index based at least in part on the set of visible elements, the index comprising information corresponding to text that was visible to the user during the session.

In an embodiment, the text that was visible to the user during the session is a portion of a total amount of text included in the web page.

In an embodiment, experience analytics server 116 performs a search for particular textual information based on the index.

Figure 10:
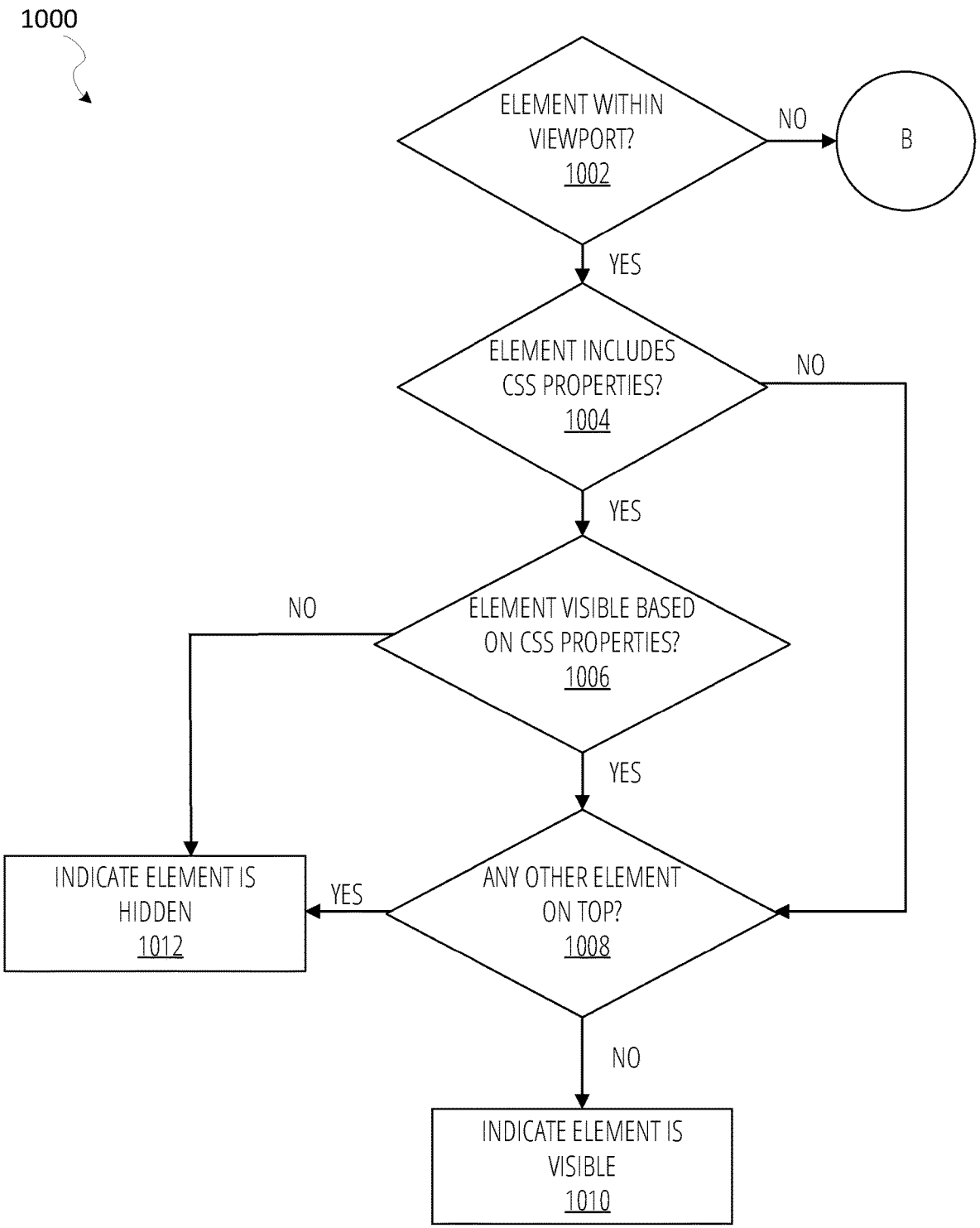
FIG. 10 is a flowchart for a process, in accordance with some examples.

FIG. 10 is a schematic diagram illustrating a process 1000, in accordance with embodiments of the subject technology.

In block 1002, experience analytics server 116 determines whether an element is within a viewport. If the element is not within the viewport, then processing may continue to a process discussed in FIG. 11 below. If the element is within the viewport, process 1000 continues to block 1004.

In block 1004, experience analytics server 116 determines whether the element includes a set of CSS properties. If the element does not include a set of CSS properties, then processing may continue to block 1008. If the element does include a set of CSS properties, process 1000 continues to block 1006.

In block 1006, experience analytics server 116 determines whether the element is visible based on the set of CSS properties. If the element is not visible based on the set of CSS properties, then processing may continue to block 1012. If the element is visible based on the set of CSS properties, process 1000 continues to block 1008.

In block 1008, experience analytics server 116 determines whether any other element is on top of the element. If any other element is on top of the element, then processing may continue to block 1012. If any other element is not on top of the element, process 1000 continues to block 1010.

In block 1010, experience analytics server 116 indicates that the element is visible.

In block 1012, experience analytics server 116 indicates that the element is hidden.

Figure 11:
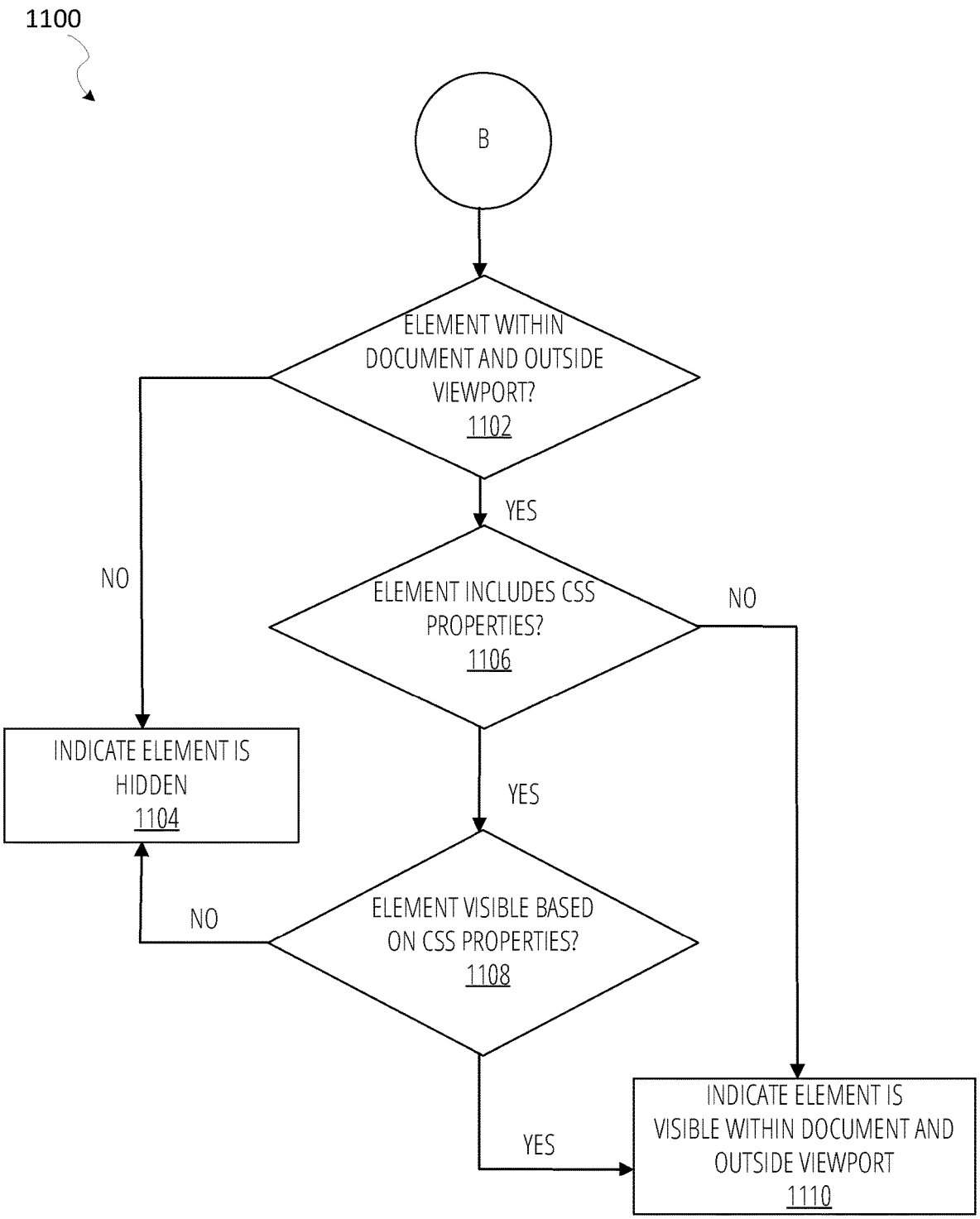
FIG. 11 is a flowchart for a process, in accordance with some examples.

FIG. 11 is a schematic diagram illustrating a process 1100, in accordance with embodiments of the subject technology.

In block 1102, experience analytics server 116 determines whether an element is within a document and outside of a viewport. If the element is within the document and outside of the viewport, then processing may continue to block 1106. If the element is not within the document and outside of the viewport, process 1100 continues to block 1104.

In block 1104, experience analytics server 116 indicates that the element is hidden.

In block 1106, experience analytics server 116 experience analytics server 116 determines whether the element includes a set of CSS properties. If the element does not includes a set of CSS properties, then processing may continue to block 1110. If the element does include a set of CSS properties, process 1100 continues to block 1108.

In block 1108, experience analytics server 116 determines whether the element is visible based on the set of CSS properties. If the element is not visible based on the set of CSS properties, then processing may continue to block 1104. If the element is visible based on the set of CSS properties, process 1100 continues to block 1110.

In block 1110, experience analytics server 116 indicates that the element is visible within the document and is outside viewport.

Machine Architecture

Figure 12:
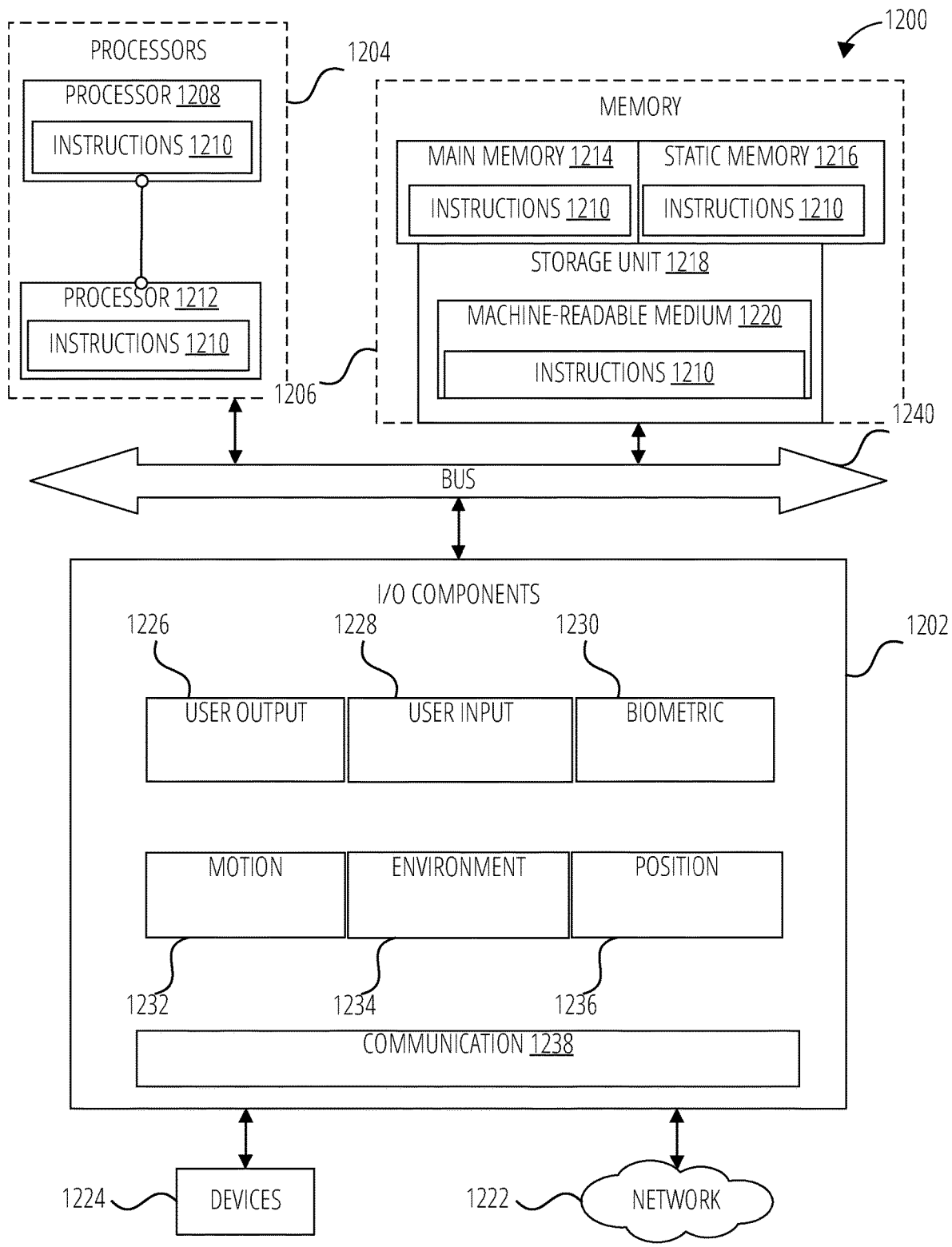
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1210 (e.g., software, a program, an application, an applet, an application, or other executable code) for causing the machine 1200 to perform any one or more of the methodologies discussed herein may be executed. For example, the instructions 1210 may cause the machine 1200 to execute any one or more of the methods described herein. The instructions 1210 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1210, sequentially or otherwise, that specify actions to be taken by the machine 1200. Further, while only a single machine 1200 is illustrated, the term "machine" shall also be taken to include a collection of machines that individually or jointly execute the instructions 1210 to perform any one or more of the methodologies discussed herein. The machine 1200, for example, may comprise the member client device 102 or any one of a number of server devices forming part of the experience analytics server 116. In some examples, the machine 1200 may also comprise both client and server systems, with certain operations of a particular method or algorithm being performed on the server-side and with certain operations of the particular method or algorithm being performed on the client-side.

The machine 1200 may include processors 1204, memory 1206, and input/output I/O components 1202, which may be configured to communicate with each other via a bus 1240. In an example, the processors 1204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1208 and a processor 1212 that execute the instructions 1210. The term "processor" is intended to include multi-core processors that may comprise two or more independent processors (sometimes referred to as "cores") that may execute instructions contemporaneously. Although FIG. 12 shows multiple processors 1204, the machine 1200 may include a single processor with a single-core, a single processor with multiple cores (e.g., a multi-core processor), multiple processors with a single core, multiple processors with multiples cores, or any combination thereof.

The memory 1206 includes a main memory 1214, a static memory 1216, and a storage unit 1218, both accessible to the processors 1204 via the bus 1240. The main memory 1206, the static memory 1216, and storage unit 1218 store the instructions 1210 embodying any one or more of the methodologies or functions described herein. The instructions 1210 may also reside, completely or partially, within the main memory 1214, within the static memory 1216, within machine-readable medium 1220 within the storage unit 1218, within at least one of the processors 1204 (e.g., within the processor's cache memory), or any suitable combination thereof, during execution thereof by the machine 1200.

The I/O components 1202 may include a wide variety of components to receive input, provide output, produce output, transmit information, exchange information, capture measurements, and so on. The specific I/O components 1202 that are included in a particular machine will depend on the type of machine. For example, portable machines such as mobile phones may include a touch input device or other such input mechanisms, while a headless server machine will likely not include such a touch input device. It will be appreciated that the I/O components 1202 may include many other components that are not shown in FIG. 12. In various examples, the I/O components 1202 may include user output components 1226 and user input components 1228. The user output components 1226 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1228 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1202 may include biometric components 1230, motion components 1232, environmental components 1234, or position components 1236, among a wide array of other components. For example, the biometric components 1230 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1232 include acceleration sensor components (e.g., accelerometer), gravitation sensor components, rotation sensor components (e.g., gyroscope).

The environmental components 1234 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 1236 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1202 further include communication components 1238 operable to couple the machine 1200 to a network 1222 or devices 1224 via respective coupling or connections. For example, the communication components 1238 may include a network interface component or another suitable device to interface with the network 1222. In further examples, the communication components 1238 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1238 may detect identifiers or include components operable to detect identifiers. For example, the communication components 1238 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1238, such as location via Internet Protocol (IP) geolocation, location via Wi-Fi® signal triangulation, location via detecting an NFC beacon signal that may indicate a particular location, and so forth.

The various memories (e.g., main memory 1214, static memory 1216, and memory of the processors 1204) and storage unit 1218 may store one or more sets of instructions and data structures (e.g., software) embodying or used by any one or more of the methodologies or functions described herein. These instructions (e.g., the instructions 1210), when executed by processors 1204, cause various operations to implement the disclosed examples.

The instructions 1210 may be transmitted or received over the network 1222, using a transmission medium, via a network interface device (e.g., a network interface component included in the communication components 1238) and using any one of several well-known transfer protocols (e.g., hypertext transfer protocol (HTTP)). Similarly, the instructions 1210 may be transmitted or received using a transmission medium via a coupling (e.g., a peer-to-peer coupling) to the devices 1224.

Software Architecture

Figure 13:
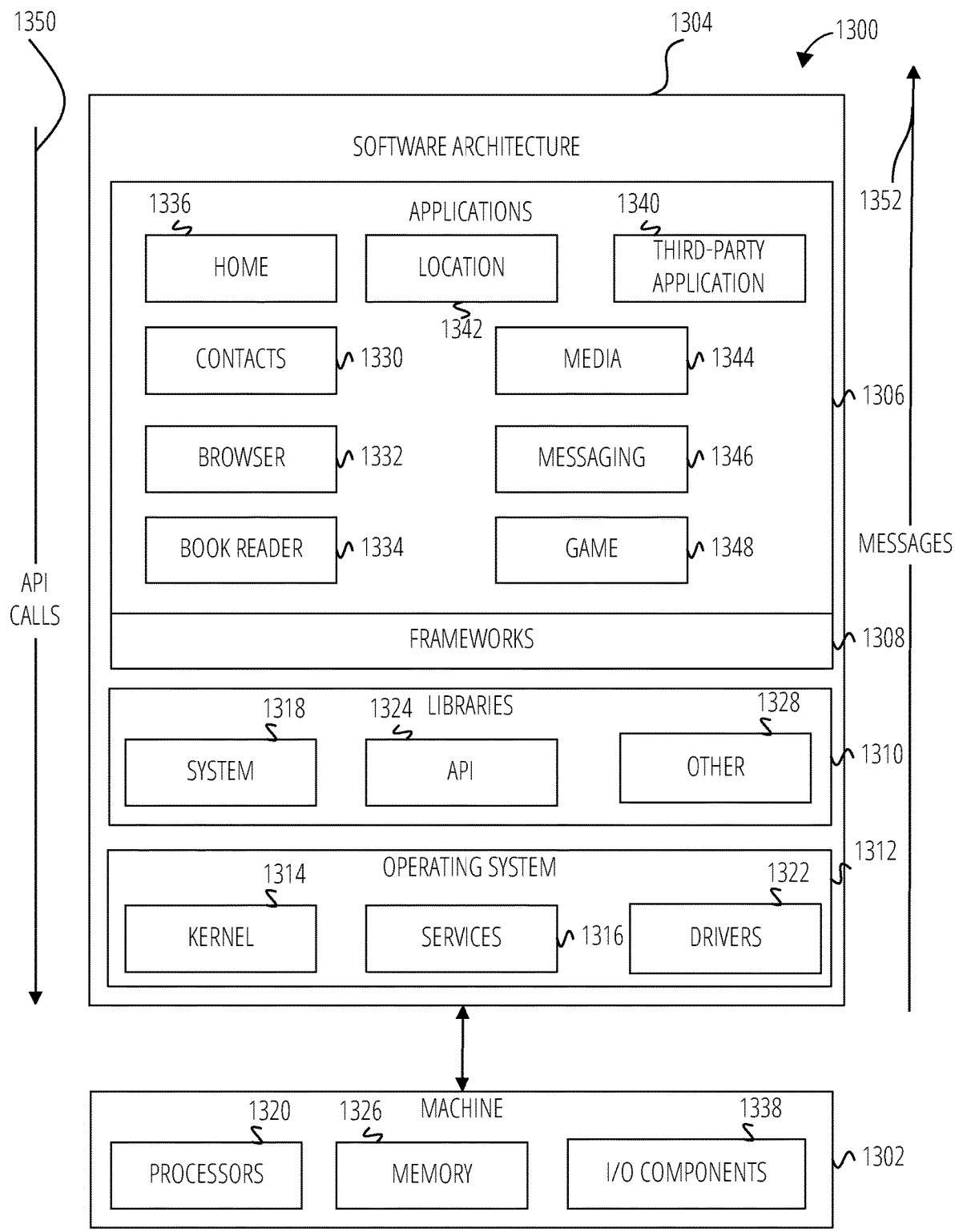
FIG. 13 is a block diagram showing a software architecture within which examples may be implemented.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1310 provide a common low-level infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a common high-level infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
receiving a session replay of a session, the session replay of the session comprising at least a video that reconstructs an individual visitor session that previously occurred on a website, the session replay corresponding to a visualization of a flow of events representing states of a set screens at various moments from the session;
extracting, from information included in the session replay of the session, a document object model, the document object model representing a screen during the session replay, the screen corresponding to a web page from the website;
receiving, from the extracted document object model, a set of nodes of the web page, each node corresponding to an element of the web page;
determining, using an intersection observer, a position and visibility of a set of first elements within a viewport of the web page, wherein determining the position and visibility of the set of first elements is based on analyzing a particular property of a first style sheet associated with at least one element of the set of first elements;
determining, using a mutation observer, a set of new elements within the viewport that was previously hidden and now visible;
providing a set of visible elements, based on the set of new elements and the set of first element, as elements that have been seen by a user during a session; and
generating an index based on the set of visible elements, the index comprising information corresponding to text that was visible to the user during the session.

2. The method of claim 1, wherein the set of first elements corresponds to a portion of the set of nodes of the web page from the document object model.

3. The method of claim 1, wherein the text that was visible to the user during the session is a portion of a total amount of text included in the web page.

4. The method of claim 1, further comprising:
performing a search for particular textual information based on the index.

5. The method of claim 1, wherein determining, using the intersection observer, the position and visibility of the set of first elements within the viewport comprises:
determining that a particular position of a particular element is included in the viewport; and
determining that the particular element is visible within the viewport based on the particular position of the particular element corresponding to a set of coordinates within the viewport.

6. The method of claim 5, wherein the set of coordinates comprises a horizontal coordinate relative to a left edge or a right edge of the viewport, and a vertical coordinate relative to a top edge or a bottom edge of the viewport.

7. The method of claim 1, wherein determining, using the mutation observer, the set of new elements within the viewport that was previously hidden and now visible comprises:
determining that a set of attributes of a particular element has changed.

8. The method of claim 7, further comprising:
determining that a child node has been added to or removed from a particular node corresponding to the particular element.

9. The method of claim 1, wherein a serialization processor receives the document object model corresponding to the web page.

10. The method of claim 1, wherein determining the visibility of the set of first elements comprises:
identifying a first element within the viewport of the web page;
identifying a second element within the viewport of the web page;
determining that the second element is overlayed above the first element; and
determining that the first element is visible and the second element is not visible based on a first style sheet property associated with the first element and a second style sheet property associated with the second element.

11. A system comprising:
a processor; and
a memory storing instructions that, when executed by the processor, configure the system to perform operations comprising:
receiving a session replay of a session, the session replay of the session comprising at least a video that reconstructs an individual visitor session that previously occurred on a website, the session replay corresponding to a visualization of a flow of events representing states of a set screens at various moments from the session;
extracting, from information included in the session replay of the session, a document object model, the document object model representing a screen during the session replay, the screen corresponding to a web page from the website;
receiving, from the extracted document object model, a set of nodes of the web page, each node corresponding to an element of the web page;
determining, using an intersection observer, a position and visibility of a set of first elements within a viewport of the web page, wherein determining the position and visibility of the set of first elements is based on analyzing a particular property of a first style sheet associated with at least one element of the set of first elements;
determining, using a mutation observer, a set of new elements within the viewport that was previously hidden and now visible;
providing a set of visible elements, based on the set of new elements and the set of first element, as elements that have been seen by a user during a session; and
generating an index based on the set of visible elements, the index comprising information corresponding to text that was visible to the user during the session.

12. The system of claim 11, wherein the set of first elements corresponds to a portion of the set of nodes of the web page from the document object model.

13. The system of claim 11, wherein the text that was visible to the user during the session is a portion of a total amount of text included in the web page.

14. The system of claim 11, wherein the operations further comprise:
performing a search for particular textual information based on the index.

15. The system of claim 11, wherein determining, using the intersection observer, the position and visibility of the set of first elements within the viewport comprises:
- determining that a particular position of a particular element is included in the viewport; and
- determining that the particular element is visible within the viewport based on the particular position of the particular element corresponding to a set of coordinates within the viewport.

16. The system of claim 15, wherein the set of coordinates comprises a horizontal coordinate relative to a left edge or a right edge of the viewport, and a vertical coordinate relative to a top edge or a bottom edge of the viewport.

17. The system of claim 11, wherein determining, using the mutation observer, the set of new elements within the viewport that was previously hidden and now visible comprises:
- determining that a set of attributes of a particular element has changed.

18. The system of claim 17, wherein the operations further comprise:
- determining that a child node has been added to or removed from a particular node corresponding to the particular element.

19. The system of claim 11, wherein a serialization processor receives the document object model corresponding to the web page.

20. The system of claim 19, wherein the document object model is extracted from information included in a session replay of the session.

21. A non-transitory computer-readable storage medium, the computer-readable storage medium including instructions that when executed by a computer, cause the computer to perform operations comprising:
- receiving a session replay of a session, the session replay of the session comprising at least a video that reconstructs an individual visitor session that previously occurred on a website, the session replay corresponding to a visualization of a flow of events representing states of a set screens at various moments from the session;
- extracting, from information included in the session replay of the session, a document object model, the document object model representing a screen during the session replay, the screen corresponding to a web page from the website;
- receiving, from the extracted document object model, a set of nodes of the web page, each node corresponding to an element of the web page;
- determining, using an intersection observer, a position and visibility of a set of first elements within a viewport of the web page, wherein determining the position and visibility of the set of first elements is based on analyzing a particular property of a first style sheet associated with at least one element of the set of first elements;
- determining, using a mutation observer, a set of new elements within the viewport that was previously hidden and now visible;
- providing a set of visible elements, based on the set of new elements and the set of first element, as elements that have been seen by a user during a session; and
- generating an index based on the set of visible elements, the index comprising information corresponding to text that was visible to the user during the session.

22. The non-transitory computer-readable storage medium of claim 21, wherein the set of first elements corresponds to a portion of the set of nodes of the web page from the document object model.

23. The non-transitory computer-readable storage medium of claim 21, wherein the text that was visible to the user during the session is a portion of a total amount of text included in the web page.

24. The non-transitory computer-readable storage medium of claim 21, wherein the operations further comprise:
- performing a search for particular textual information based on the index.

25. The non-transitory computer-readable storage medium of claim 21, wherein determining, using the intersection observer, the position and visibility of the set of first elements within the viewport comprises:
- determining that a particular position of a particular element is included in the viewport; and
- determining that the particular element is visible within the viewport based on the particular position of the particular element corresponding to a set of coordinates within the viewport.

26. The non-transitory computer-readable storage medium of claim 25, wherein the set of coordinates comprises a horizontal coordinate relative to a left edge or a right edge of the viewport, and a vertical coordinate relative to a top edge or a bottom edge of the viewport.

27. The non-transitory computer-readable storage medium of claim 21, wherein determining, using the mutation observer, the set of new elements within the viewport that was previously hidden and now visible comprises:
- determining that a set of attributes of a particular element has changed.

28. The non-transitory computer-readable storage medium of claim 27, wherein the operations further comprise:
- determining that a child node has been added to or removed from a particular node corresponding to the particular element.

29. The non-transitory computer-readable storage medium of claim 21, wherein a serialization processor receives the document object model corresponding to the web page.

30. The non-transitory computer-readable storage medium of claim 29, wherein the document object model is extracted from information included in a session replay of the session.

* * * * *

UNITED STATES PATENT AND TRADEMARK OFFICE
CERTIFICATE OF CORRECTION

PATENT NO. : 11,947,899 B2
APPLICATION NO. : 18/204125
DATED : April 2, 2024
INVENTOR(S) : Botbol et al.

Page 1 of 1

It is certified that error appears in the above-identified patent and that said Letters Patent is hereby corrected as shown below:

In the Specification

In Column 1, Line 19, delete "web sites" and insert --websites-- therefor

In Column 1, Line 20, delete "Web sites" and insert --Websites-- therefor

In Column 1, Line 23, delete "web site" and insert --website-- therefor

In Column 1, Line 24, delete "web site" and insert --website-- therefor

In Column 2, Line 36, delete "web site" and insert --website-- therefor

In Column 6, Line 56, delete "web site" and insert --website-- therefor

In Column 8, Line 26, delete "web site" and insert --website-- therefor

In Column 8, Line 28, delete "web site" and insert --website-- therefor

In Column 8, Line 58, delete "web site" and insert --website-- therefor

In Column 9, Line 35, delete "interface" and insert --intersection-- therefor

In Column 9, Line 40, delete "interface" and insert --intersection-- therefor

In Column 12, Line 31, delete "IntersectionOserver" and insert --IntersectionObserver-- therefor In Column 12, Line 37, delete "IntersectionOserver" and insert --IntersectionObserver-- therefor In Column 16, Line 32, delete "1206," and insert --1214,-- therefor Signed and Sealed this
Seventh Day of January, 2025

Derrick Brent
*Acting Director of the United States Patent and Trademark Office*